(12) United States Patent
Kuckhoff et al.

(10) Patent No.: US 11,661,973 B2
(45) Date of Patent: *May 30, 2023

(54) FLEXIBLE REINFORCED RADIAL SPLINE COUPLING AND METHOD

(71) Applicant: Dodge Industrial, Inc., Oxford, CT (US)

(72) Inventors: Thomas E. Kuckhoff, Greenville, SC (US); James R. Rubel, Simpsonville, SC (US)

(73) Assignee: Dodge Industrial, Inc., Oxford, CT (US)

(*) Notice: Subject to any disclaimer, the term of this patent is extended or adjusted under 35 U.S.C. 154(b) by 443 days.

This patent is subject to a terminal disclaimer.

(21) Appl. No.: 16/819,619

(22) Filed: Mar. 16, 2020

(65) Prior Publication Data

US 2021/0285502 A1    Sep. 16, 2021

(51) Int. Cl.
*F16D 3/56* (2006.01)
*F16D 3/74* (2006.01)
*F16D 3/54* (2006.01)

(52) U.S. Cl.
CPC .............. *F16D 3/56* (2013.01); *F16D 3/74* (2013.01); *F16D 3/54* (2013.01)

(58) Field of Classification Search
CPC .............. F16D 3/56; F16D 3/74; F16D 3/54
USPC .................................. 464/49, 73, 88
See application file for complete search history.

(56) References Cited

U.S. PATENT DOCUMENTS

| 2,867,102 | A | | 1/1959 | Williams |
| 2,867,103 | A | | 1/1959 | Williams |
| 5,429,220 | A | * | 7/1995 | Sabee ............... F16D 3/68 |
| | | | | 464/88 |
| 6,342,011 | B1 | | 1/2002 | Pokrandt et al. |
| 9,789,903 | B2 | * | 10/2017 | Moriyama ............ F16D 3/68 |
| 10,982,721 | B2 | * | 4/2021 | Oosawa ............. F16D 3/54 |
| 11,226,010 | B2 | * | 1/2022 | Rubel ............... F16D 3/72 |

FOREIGN PATENT DOCUMENTS

FR    1.260.083    *    3/1961    ............. 464/88

* cited by examiner

*Primary Examiner* — Greg Binda
(74) *Attorney, Agent, or Firm* — Robinson & Cole LLP

(57) ABSTRACT

A system and method for increasing a tooth shear strength without also increasing a torsional rigidity of a flexible spline disposed between two hubs of a flexible coupling for transmitting mechanical motion between two shafts includes attaching a stiffening cap to an end of a flexible spline, between the flexible spline and the hubs and inserting a plurality of dowels into the teeth of the flexible spline to reinforce the flexible spline.

14 Claims, 12 Drawing Sheets

FLEXIBLE REINFORCED RADIAL SPLINE COUPLING AND METHOD

FIELD OF THE DISCLOSURE

The present disclosure relates to power transmission and, more particularly, to mechanical power transmission using flexible or yielding spline couplings.

BACKGROUND

Elastomeric couplings for connecting driving and driven mechanical components, typically in the form of rotating shafts are known. Elastomeric couplings are uniquely suited for use in applications where shock, vibration and misalignment may be present. In these types of couplings, driving and driven metal or otherwise stiff hubs are connected on either side of a transmission junction and are connected to one another using an elastomeric or yielding material such as EPDM, natural rubber, Neoprene, Hytrel® and the like. In this way, the yielding material can provide flexing along three axes to accommodate torsional, angular, and parallel misalignment, and also torque spikes and impact drive loads.

Conventional elastomeric jaw couplings could meet dynamic life standards for cyclic shock loads or dynamic life standards for accelerated operation life. Elements could meet both standards. As a result high damping applications were limited by the size of the coupling, resulting in consumers required to increase the size of the coupling. High torque applications were susceptible to shock loading passing through the coupling and limiting the life of the customers' driver equipment.

Conventional elastomeric jaw and wrap couplings utilize a portfolio of homogeneous elastomeric materials to meet a wide range of industrial applications with a focus on industrial pumping. The elastomer jaw and wrap coupling operate by positive engagement features on the shaft hubs and transmits torque through an elastomeric element between the positive engagement shaft features. Where the shaft hubs connect to the shaft by means of keys, setscrews, or other locking devices. These elastomeric elements are placed in shear and bending, both stresses fatigue the element throughout the operational life, and the torque rating of the coupling is directly correlated to the strength of the homogeneous element material, which is common urethane or natural rubber. The element visually mimics a split spline, where the element is allowed to wrap between the positive engagements features of the shaft hubs. The application which utilize wrap and jaw coupling could require: high load capacity which is achieved with a harder material or high damping capacity which is achieved through a softer material. However, materials which meet each requirement are mutually exclusive. Therefore, the current isotropic materials do not meet high load and high damping simultaneously. As a result, the element portfolio for manufacturers is large and difficult to ensure the right element is integrated into a new application.

A few examples of such flexible spline couplings can be seen in U.S. Pat. Nos. 2,867,102 and 2,867,103 (the Williams references), which both issued on Jan. 6, 1959, and describe a flexible coupling for shafts and a gripping arrangement for flexible couplings for power transmission shafts. The types of couplings described in the Williams references are widely used in various industries, but their applications are not without known issues and limitations.

One known issue or limitation of known flexible spline couplings is that, during high torque or shock loading situations, the teeth along the outer and inner diameter of the sleeve element deform and roll underneath the opposing teeth of the connected hubs. In extreme conditions, such deformation results in an interruption in torque transmission when the teeth of the flexible element either shear off the element entirely or eject the element from the connected hubs. It has been proposed in the past to increase the stiffness of the elastomeric material such that higher torque loads can be carried. However, such stiffness increases, while possibly better suited to withstand higher torque loads than the baseline stiffness flexible splines, decrease the sleeve's flexing ability and, therefore, the coupling's ability to withstand misalignment.

BRIEF SUMMARY OF THE DISCLOSURE

In one aspect, the present disclosure describes flexible coupling. The flexible coupling includes two hubs, each hub configured to engage a shaft along a central portion and engage flexible spline along an engagement portion. The flexible coupling further includes a flexible member assembly of single or multiple stiffness disposed between the two hubs in engaged relation between the engagement portions of each of the two hubs. The flexible member assembly includes a flexible spline having a first end and a second end, a stiffening cap attached to the first end of the flexible spline between the flexible spline and the engagement portion of one of the two hubs.

In another aspect, the present disclosure describes a flexible spline for use with a flexible coupling. The flexible coupling includes two hubs, each hub configured to engage a shaft along a central portion and engage the flexible spline along an engagement portion. The flexible spline further includes a plurality of dowels attached to a first end of the flexible spline. The plurality of dowels is adapted to be disposed between the flexible spline and the engagement portion of one of the two hubs of the flexible coupling.

In yet another aspect, the disclosure describes a method for increasing a tooth shear strength without also increasing a torsional rigidity of a flexible spline disposed between two hubs of a flexible coupling for transmitting mechanical motion between two shafts. The method includes aligning and attaching a stiffening cap to a first end of the flexible spline between the flexible spline and an engagement portion of one of the two hubs.

DETAILED DESCRIPTION

The present disclosure is directed to flexible spline couplings and, more particularly, to systems and methods for improving the couplings' ability to withstand torque loading variations without compromising their ability to handle misalignment during operation. Stated differently, the flexible couplings exhibit an improved resistance to torsional shear without also increasing their torsional rigidity. In the disclosed embodiments, structures are introduced to stiffen each tooth at either end of the coupling spline or sleeve, along both the inner and outer diameters of the sleeve, by inserting and bonding or otherwise attaching a stud or dowel extending through a portion of each tooth, and/or by encapsulating the teeth in boding relation to a liner. The studs or liners advantageously support the teeth and prevent excessive deformation, which allows for high torque transmission, without impacting the misalignment capabilities or the torsional stiffness of the sleeve coupling element. The increased torque capacity advantageously provides an opportunity to downsize the coupling size for a particular application, which can result in a cost savings for the integrator.

The present disclosure allows for consolidation within the product offering, provides damping to high torque applications, provides higher torque rating for damping applications, and extends the number of potential applications the wrap and jaw coupling can be integrated into, while retrofitting into current coupling install base.

The present disclosure also provides higher torque applications and increased damping and provides high damping applications higher torque rated couplings, and the opportunity to decrease the size of the coupling, by integrating a stronger material at the core of a softer material element. This decrease in size reduces the overall cost of the complete coupling. The reinforcement carries the load of the element while the softer material elastically deforms and resists the shock loading from passing through the coupling.

By reinforcing the core of a soft element with a stiffer material the element can meet higher torque ratings while maintaining damping characteristics of soft materials. While this is achieved through creating anisotropic properties to allow stronger and damping to no longer be mutually exclusive it is a result of the size, shape, location, and material of the core.

Previously proposed solutions to increasing torque transmission capacity of a coupling having a given size involve changing the base rubber formulation of the flexible spline to an overall stiffer formulation. However, the increased stiffness of the sleeve or spline has been found to inversely effect misalignment capacity, installation time, and torsional damping characteristics of the coupling. Additionally, stiffer sleeves have been found to increase the resultant load on the driven and driving equipment resulting in reduced equipment life.

Figure 1:
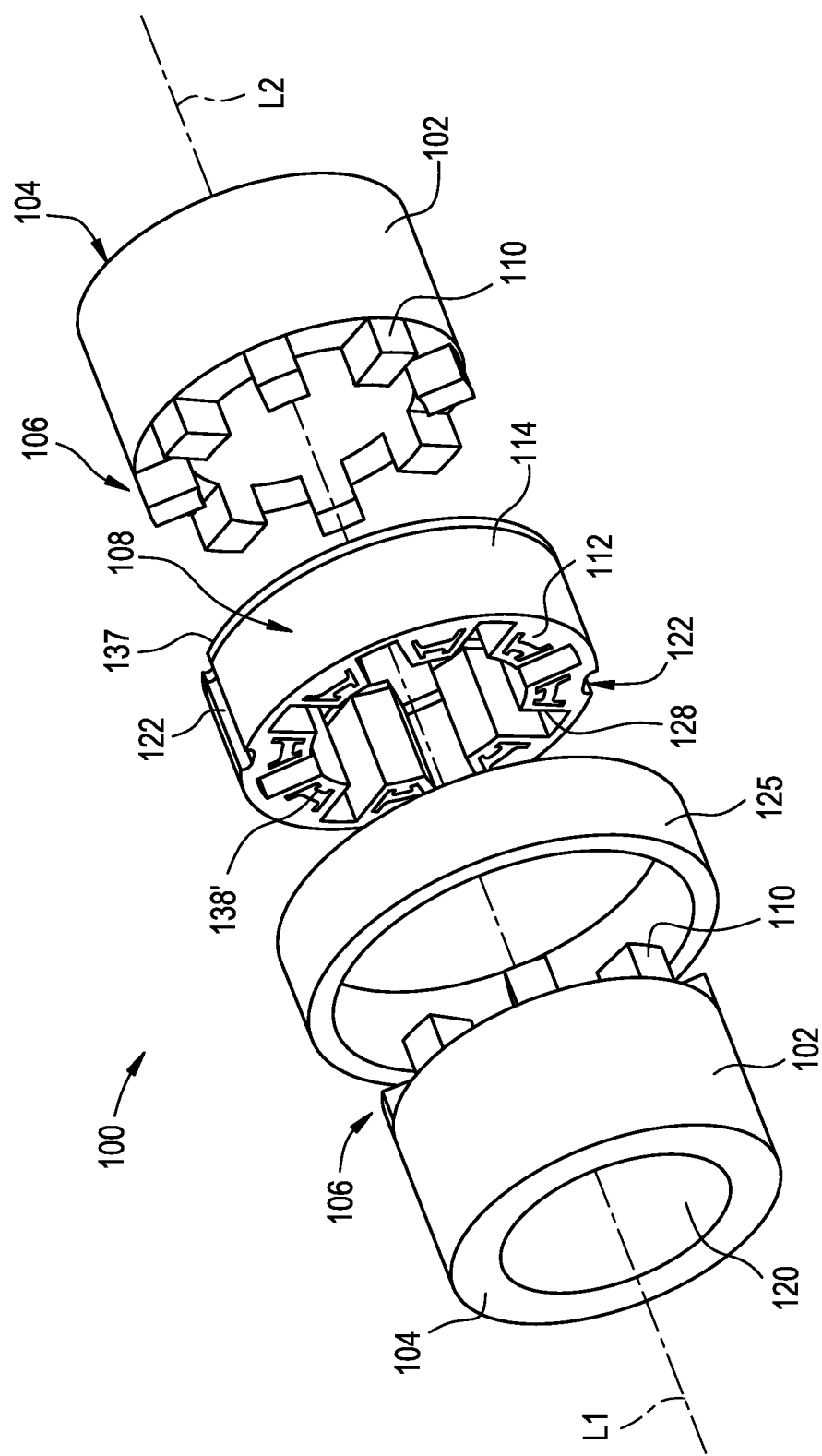
FIG. 1 is an exploded view of a flexible spline coupling in accordance with an embodiment of the disclosure.
Figure 2:
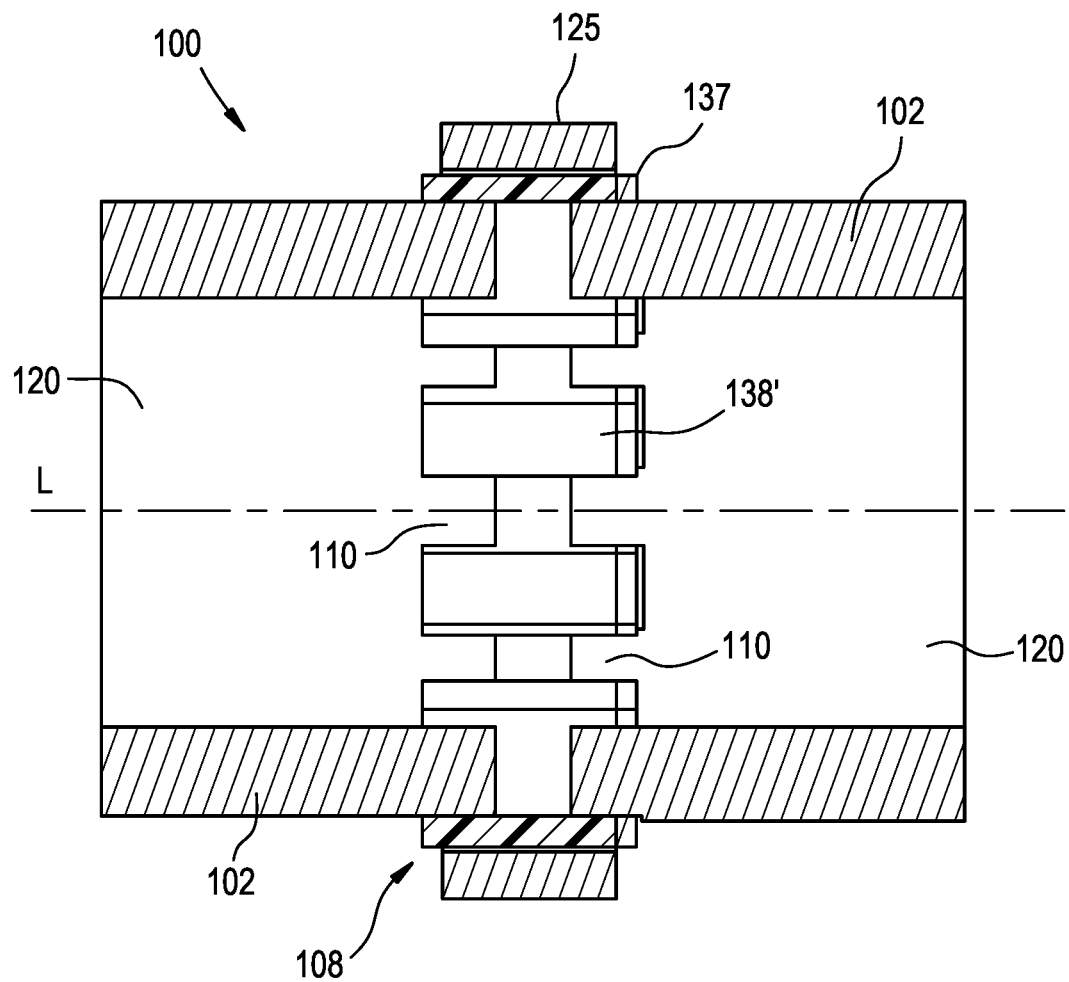
FIG. 2 is a cross sectional view of an assembled flexible spline coupling in accordance with an embodiment of the disclosure.

A perspective view of a flexible coupling 100 in accordance with the disclosure is shown in FIG. 1 in an exploded state, and in an assembled state in FIG. 2 to illustrate certain internal structures thereof.

Figure 3A:
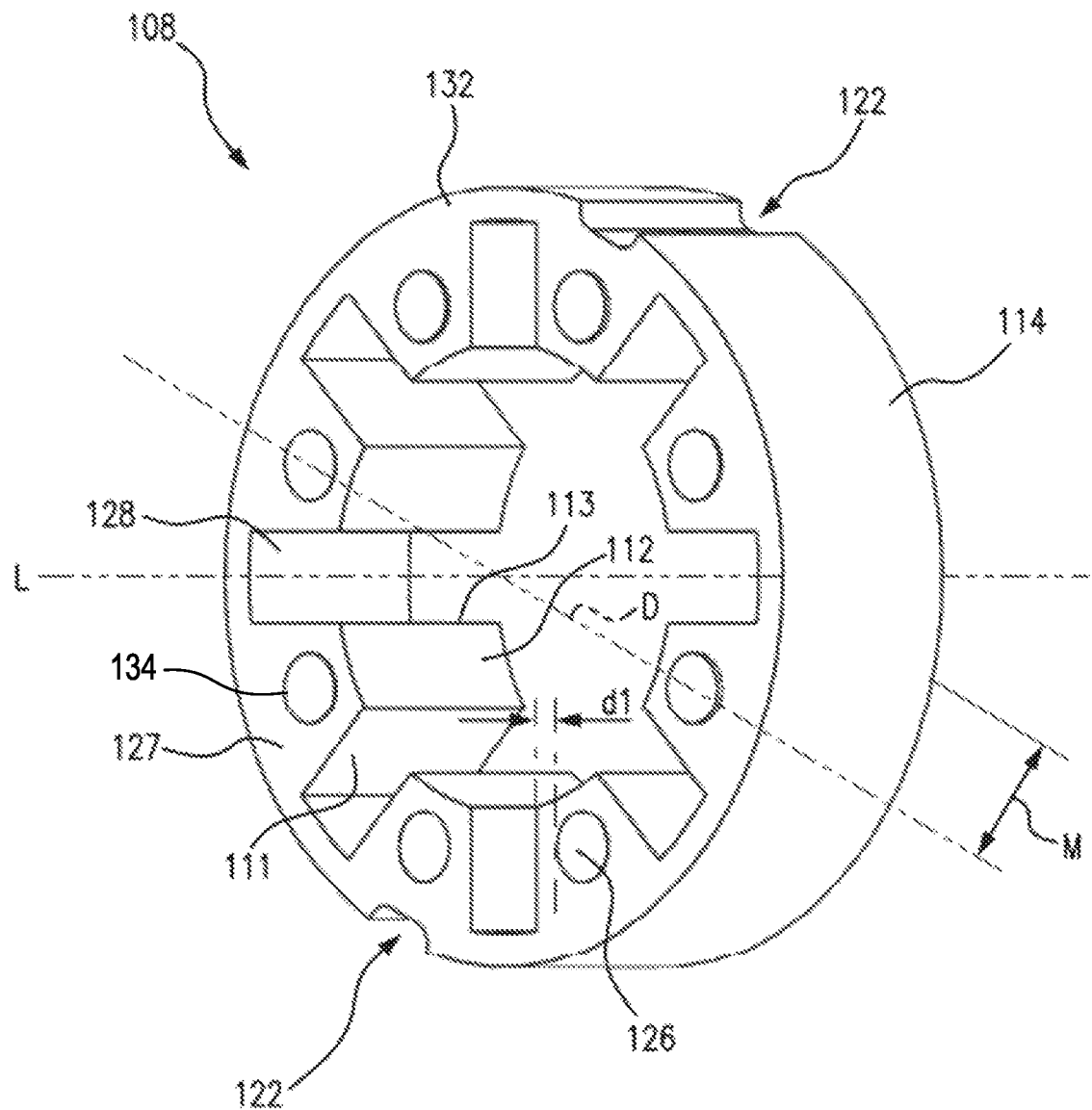
FIG. 3A is a perspective view of a flexible spline in accordance with an embodiment of the disclosure.

Referring now to FIG. 1, there is an exploded view of a flexible spline coupling 100 in accordance with an embodiment of the disclosure. The coupling 100 includes two hubs 102, each having a central portion 104 configured to engage a shaft (not shown) and an engagement portion 106 that is configured to engage toothed ends of a flexible member assembly 108. In the illustrated embodiment, the engagement portion 106 of each hub 102 includes a row of teeth 110 radially disposed with one another with respect to a longitudinal axis, L1, L2. The rows of teeth 110 meshably engage corresponding rows of teeth 112, respectively, formed at either axial end of a flexible spline member 114 included in the flexible member assembly 108. As shown in FIG. 3A, the flexible spline 114 may have an overall width, M, in the axial direction. In certain embodiments, the flexible member assembly 108 may be configured to have single or multiple stiffness depending on its operational usage.

Installed in the typical fashion, each hub 102 is installed close to an end of a shaft (not shown) through an axial opening 120 extending through the central portion 104 of the hub 102. In alternative embodiments, spacer hubs may also be used (not shown here) in the known fashion to mount the flexible coupling. In the illustrated embodiment, member assembly 108 may include a key slot 122 having a setscrew (not shown) disposed in a bore extending through a wrap portion 125 configured to secure the member assembly 108 about teeth 110 of hubs 102. In certain embodiments, the wrap portion 125 may be made of metal. In other embodiments the wrap portion 125 may be optional with member assembly 108 being configured as a unitary member or piece. The two shafts onto which the hubs 102 are mounted may be two sides of a drive arrangement, for example, between a driving component such as a motor and a driven component such as a pump, drive shaft, conveyor and the like. As is the often the case, the torque transmitted through the coupling 100 may include transient disturbances such as torque spikes, vibrations and the like. Moreover, there may be a misalignment between the two shafts such that an axis L1 (FIG. 1) extending through one hub 102 may be misaligned and/or non-parallel with an axis L2 extending through the mating hub 102. The transient effects in the transmitted torque may be absorbed or otherwise dampened by the elastomeric or resilient material from which the flexible spline 114 is made. The flexible spline 114 can also flex and conform to the misalignment between the axes L1 and L2.

In this embodiment, the individual dowels 126 may be assembled, adhered, press fitted or similar, into corresponding bores 134 in the row of teeth 112. In such an embodiment, a set of dowels such as those shown in FIG. 3A or FIG. 3B would be loosely provided and inserted, one dowel into each corresponding bore.

Referring now to FIG. 2, there is a cross sectional view of an assembled flexible spline coupling 100 in accordance with an embodiment of the disclosure. The member assembly 108 disposed between hubs 102 is shown with dowels 126 connected to plate 137 and disposed within teeth 112 of member assembly 108 and proximal teeth 110 of hubs 102. In certain embodiments, the plurality of dowels 126 may be configured to reinforce teeth 112 against torque and shear forces created between the driven hub 102 and the drive hub 102 during use.

Figure 4A:
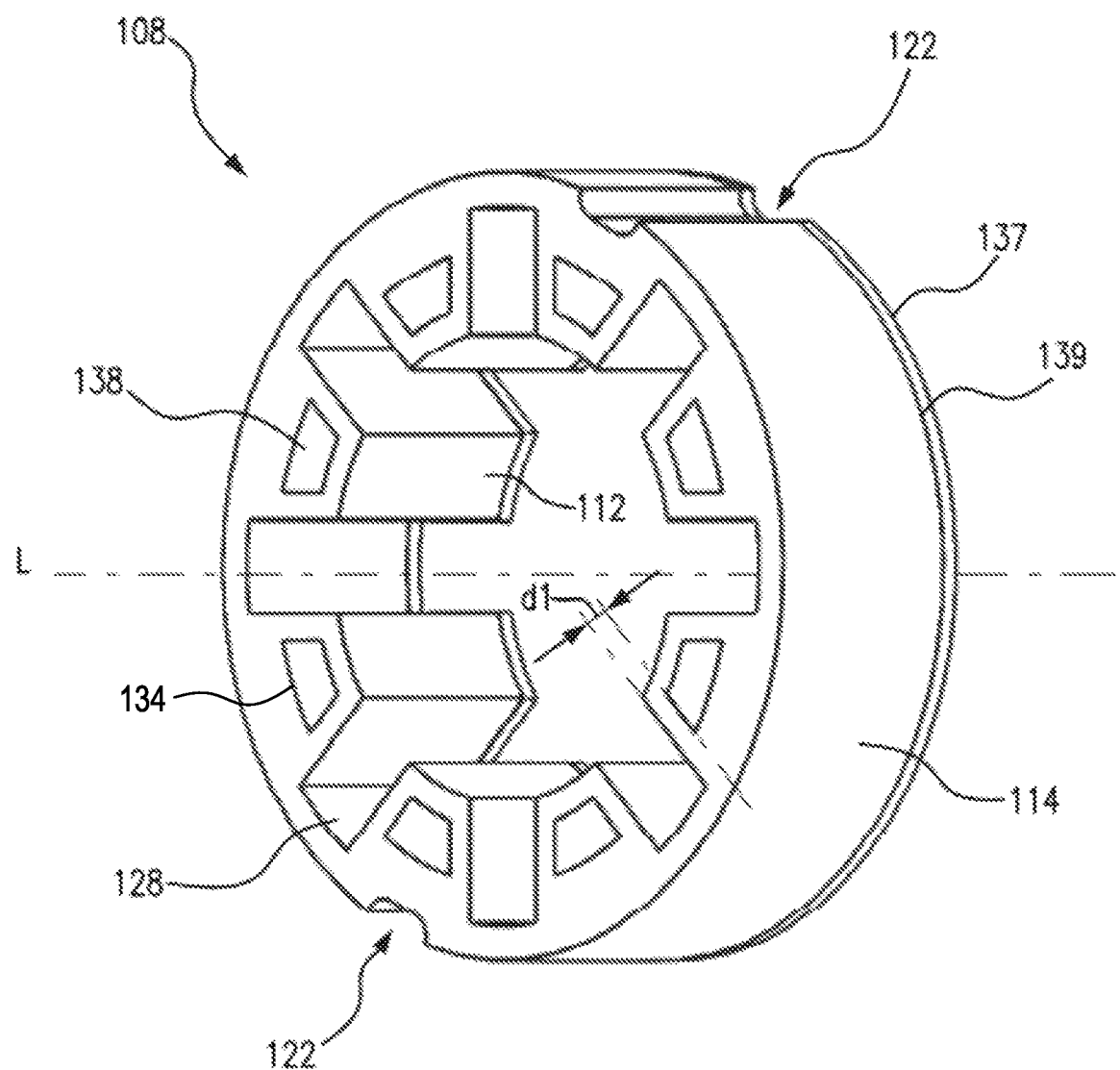
FIG. 4A is a perspective view of a flexible spline in accordance with an alternative embodiment of the disclosure.
Figure 4B:
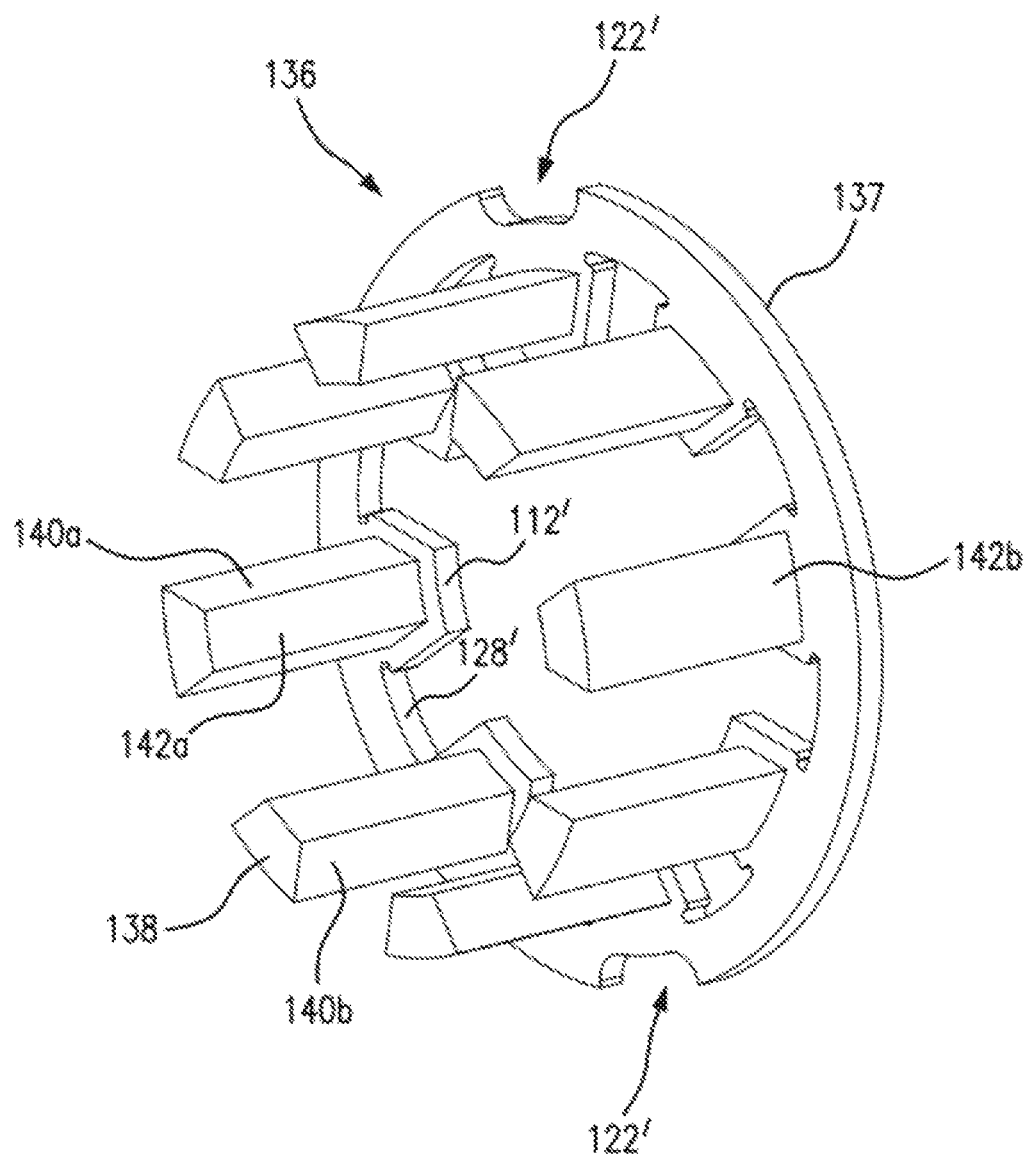
FIG. 4B is a perspective view of a tooth support cap of the flexible spline of FIG. 4A.

To increase the ability of the flexible spline 114 to transfer torque while maintain its flexibility and, thus, its ability to conform to misaligned axes, a tooth support or stiffening cap 136 is used in the embodiment shown in FIG. 2, and also in FIGS. 4A, 4B, and 5. A disassembled view of the flexible spline 114 and the tooth support cap 136 is also shown in FIGS. 4A and 4B. In reference to these figures, the tooth support cap 136 includes a plate 137 having a generally annular shape that includes an inner periphery at 112' and 128' and an outer periphery at 137 (FIG. 4B). A plurality of dowels 126 is integrally formed or otherwise connected to the plate 137. The plurality of dowels 126 are connected at one end to the plate 137 and extend symmetrically around the plate adjacent the outer periphery at 137.

Figure 3B:
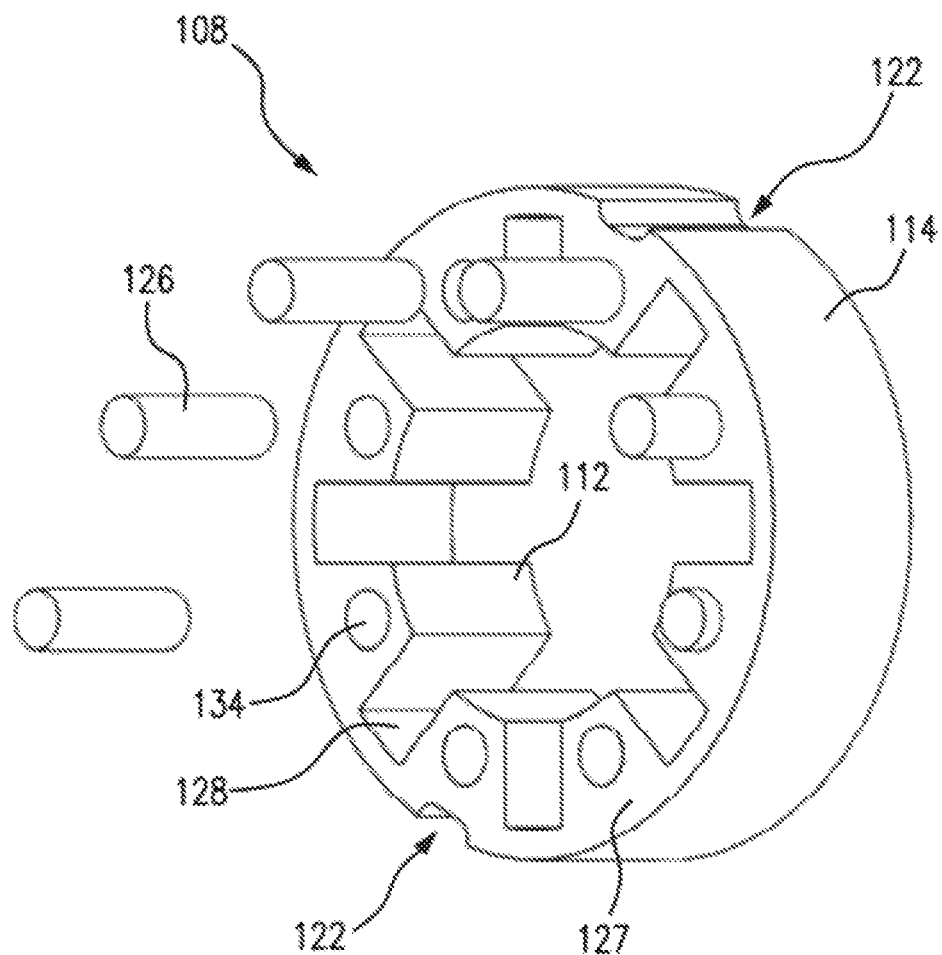
FIG. 3B is a perspective view of an assembly of the flexible spline in accordance with the embodiment of FIG. 3A.

Referring now to FIGS. 3A and 3B, there is a perspective view of a flexible spline 108 in accordance with an embodiment of the disclosure and a perspective view of an assembly of the flexible spline, respectively. As can be seen in FIGS. 3A and 3B, the plurality of dowels 126 extend parallel to one another and have generally the same length in the exemplary embodiment shown. Further, the plurality of dowels 126 extend parallel to a longitudinal axis, L, as shown. As can be appreciated, however, the dowels 126 may have different lengths. For example, the dowels 126 may be longer and extend deeper into the flexible coupling adjacent the inner periphery at 112 and 128. In this embodiment, the dowels have a circular cross section that results in a cylindrical shape for each dowel. In certain embodiments, the plurality of dowels 126 are also connected on the same side of the plate 137 as shown in FIG. 4B. When the tooth support cap 136 is installed onto one end of the flexible spline 114, for example, the end shown in FIG. 4B, the dowels 126 are inserted into openings or bores 134 extending through the axial length of the corresponding inner and outer rows of teeth until the plate 137 is flush with an end face of the flexible spline 114. In some embodiments, the teeth 112 and dowels 126 align along a diameter, D, of the flexible spline 114. It is noted that the term "dowel" does not indicate a shape for the structures described, which can have circular and non-circular cross sections, as will be described for alternative embodiments later.

As can be seen in FIG. 3A, each tooth 112 forms a bore 134. In this embodiment, the bore 134 has a circular cross section. The radial location of the bore 134 is offset from the outer periphery at 114 and extends in an axial direction, i.e., parallel to the longitudinal axis L, through each tooth 112. The bore 134 can be placed close to the geometrical center of the tooth 112 such that a first inclined face 111 and a second inclined face 113 extend tangentially to the bore 134 but at an offset distance, dl, therefrom, and the peak at 112 is radially aligned with a center point of the bore 134.

The shape of the plate 137 and, specifically, the inner and outer peripheries are arranged to match the shape of the inner and outer peripheries 132 of the flexible spline 114. Moreover, the number and placement of the first plurality of dowels 126, and also the diameter of each dowels 208, is selected to match the arrangement, placement and size of the bores 134 formed in the outer plurality of teeth 114.

When installing the tooth support cap 136 onto the end face 139, a layer of adhesive at 139 may be spread over the face of the plate 137 and also along the lateral surfaces of the pluralities of dowels 138 before the cap 136 is installed onto the end face 139. When the cap 136 is in an installed position onto the end face 139, the side of the plate 137 from which the dowels 138 extend is flush or abuts onto the end face 139, and the dowels 138 extend through the corresponding teeth 112. In the embodiment shown in FIG. 4A, for example, the dowels 138 are flush with end openings in the teeth 112.

In certain embodiments, an overmolding process may be used to incorporate two different materials, for example, the plurality of dowels 138 into teeth 112 to capture the dowels 138 inside of teeth 112 without having to use adhesives or the like. Overmolding may completely cover the reinforcement to protect the reinforcement during operation.

In FIG. 3B, an embodiment illustrates an assembly of inserting the plurality of dowels 126 into bores 134 disposed within teeth 112 to create a reinforced structure for teeth 112 to resist shear and torque forces during use.

Referring now to FIG. 4A, there is a perspective view of a flexible spline 114 in accordance with an alternative embodiment of the disclosure. In this embodiment, a plurality of dowels 138 comprise a polygonal shape, such as, a trapezoidal form in cross section. Further, dowels 138 also may be configured to extend parallel to the longitudinal axis, L, as shown. In some embodiments, the dowels 138 are inserted as a portion of the tooth support cap 136 with dowels 138 configured to be integral with and connected to end support plate 137. In certain embodiments, plate 137 is formed to be congruent to match and correspond to the circumferential shape of flexible spline 114 when dowels 138 are inserted into flexible spline 114 and plate 137 abuts a first end of flexible spline 114, as shown in FIG. 4A.

FIG. 4B is a perspective view of a tooth support cap 136 of the flexible spline 114 of FIG. 4A. In certain embodiments, the tooth support cap 136 comprises an end support plate 137 as described above and a plurality of dowels 138' connected and integral thereto. Support plate 137 may include surfaces 112' congruent to the inner circumference of teeth 112 and may include surfaces 128' congruent to the inner circumference of tooth gap 128. In some embodiments, support plate 137 may include surfaces 122' congruent to the outer circumference and aligning to the positioning of key slots 122, as shown. End support plate 137 may comprise a metal, a ceramic or other hardened or stiff material to reinforce teeth 112.

In certain embodiments, dowels 138 may include a first side face 140a, a second side face 140b disposed opposite the first side face 140a, an inner face 142a and an outer face 142b with the inner face 142a proximal the inner circumference of flexible spline 114 and the outer face 142b proximal the outer circumference of flexible spline 114.

Figure 5A:
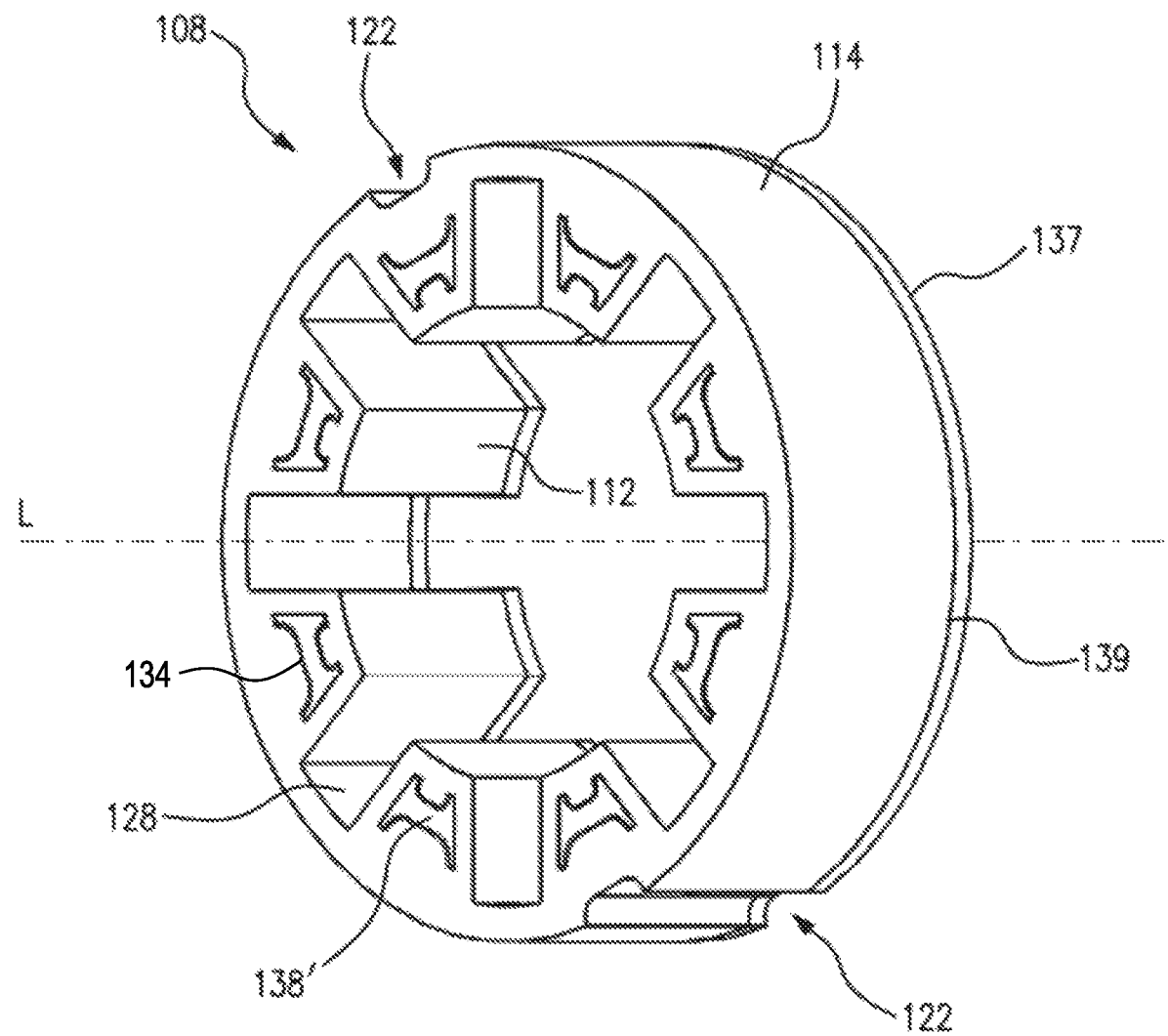
FIG. 5A is a perspective view of a flexible spline in accordance with an alternative embodiment of the disclosure.

Referring now to FIG. 5A, there is a perspective view of a flexible spline 114 in accordance with an alternative embodiment of the disclosure. In this embodiment, a plurality of dowels 138' having an I-beam polygonal cross section are disposed within similarly shaped bores in the flexible spline 114. As can be appreciated, I-beams are known for their substantial resistance to shear, bending and torque forces in construction and the like. In certain embodiments, the dowels 138' are disposed circumferentially about the flexible spline 114 with their cross sections radially spaced equidistant about a longitudinal axis, L, within teeth 112. Dowels 138' are disposed within teeth 112 with the I-beam cross section having a narrow portion of the cross section disposed in a central portion of the teeth 112 and two wider portions of the cross section disposed proximal each side portion of the teeth 112 to provide maximum resistance or reinforcement to shear, bending and torque forces.

Figure 5B:
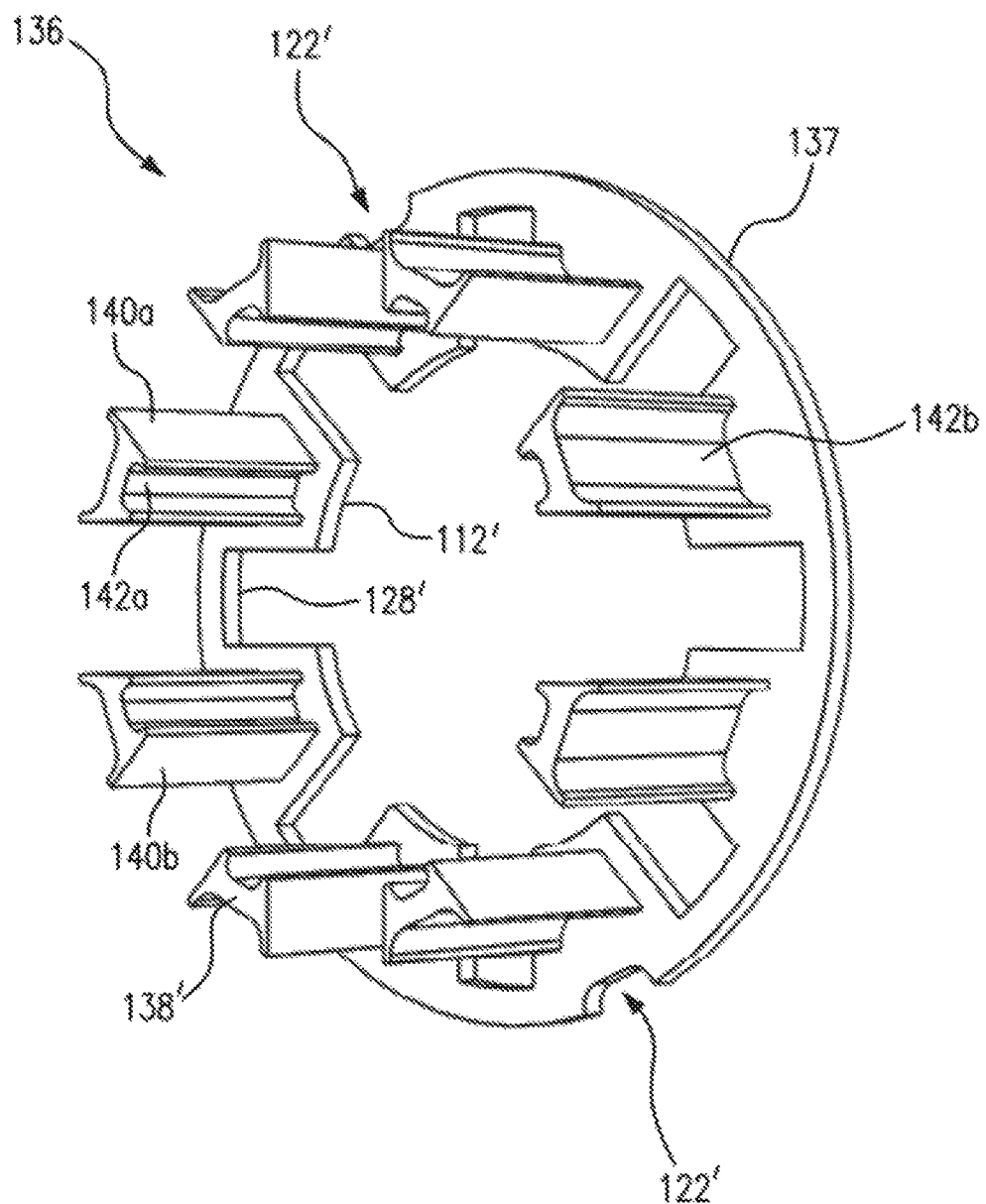
FIG. 5B is a perspective view of a tooth support cap of the flexible spline of FIG. 5A.

FIG. 5B is a perspective view of a tooth support cap 136 of the flexible spline 114 of FIG. 5A. In certain embodiments, the tooth support cap 136 comprises an end support plate 137 as described above and a plurality of dowels 138' connected and integral thereto. Support plate 137 may include surfaces 112' congruent to the inner circumference of teeth 112 and may include surfaces 128' congruent to the inner circumference of tooth gap 128. In some embodiments, support plate 137 may include surfaces 122' congruent to the outer circumference and aligning to the positioning of key slots 122, as shown. End support plate 137 may comprise a metal, plastic, high stiffness elastomer, ceramic or other hardened or stiff material to reinforce teeth 112.

In certain embodiments, the dowels 138' are integral and connected to end support plate 137 as described above with respect to dowels 138 in FIGS. 4A and 4B.

An alternative embodiment for the flexible spline 114 and tooth support cap 136 is shown in FIGS. 4A and 5A. In these figures, structures and features that are the same or similar to corresponding structures and features described previously are denoted and referred to by the same reference numerals as previously used for sake of description.

In this embodiment, it can be seen that the shape of the dowels 138 and 138' is non-circular in cross section. It should be noted that the shape of the dowels is contemplated to have any appropriate shape, for example, triangular as shown here but also other shapes, including but not limited to semi-circular, C-shaped, Y-shaped, T-shaped, X-shaped, I-shaped, V-shaped, star shaped, rectangular, hexagonal, pentagonal, wave-shaped, and others. Shape selection may depend on various factors including the desired contact area between the dowels and their bores, the material of the dowels, the material of the flexible spline, the amount and type of adhesive used between the dowels and their corresponding bores, the manufacturing method used to construct the cap, and others. The cap may be constructed by any sufficiently rigid material including a thermoplastic material, nylon (including glass-filled nylon), metal, fiberglass composites, high durometer elastomers, and the like.

While various features in the embodiment shown in FIGS. 4A and 5A are similar to the embodiment shown in FIGS. 3A and 3B with respect to the general arrangement of components, it can be seen that here the shape of the dowels 138 and 138' is polygonal rather than circular. Consequently, the bores 134 also have a polygonal shape that mates with the shape of the dowels 138 and 138'. Because of this difference, a different type of support may be lent by the dowels to the outer and inner peripheries of the flexible spline 114 and the end face 139. More specifically, where a tangential relationship exists between the inclined surfaces 111 and 113 and the outer surface of the dowels 138 and 138' having a minimum thickness dl in the embodiment shown in FIG. 4A, the polygonal dowels 138 and 138' of the embodiment shown in FIGS. 4A and 5A includes an orientation of the dowels in side faces 140a, 140b of the dowels 138 and 138' are orientated to be generally parallel with the inclined side faces 111 and 113 of the teeth 112. The distance dl thus denote a layer of flexible material that has a uniform thickness over each side face 140a, 140b and provides a more reliable cushioning effect that, in certain applications, may avoid possible pinch points in embodiments with a non-uniform bore wall thickness between the dowel and an exterior surface of the tooth. In this embodiment, the third face 142a of each dowel 138 or 138' lies generally tangentially relative to an end-face 127.

Figure 7:
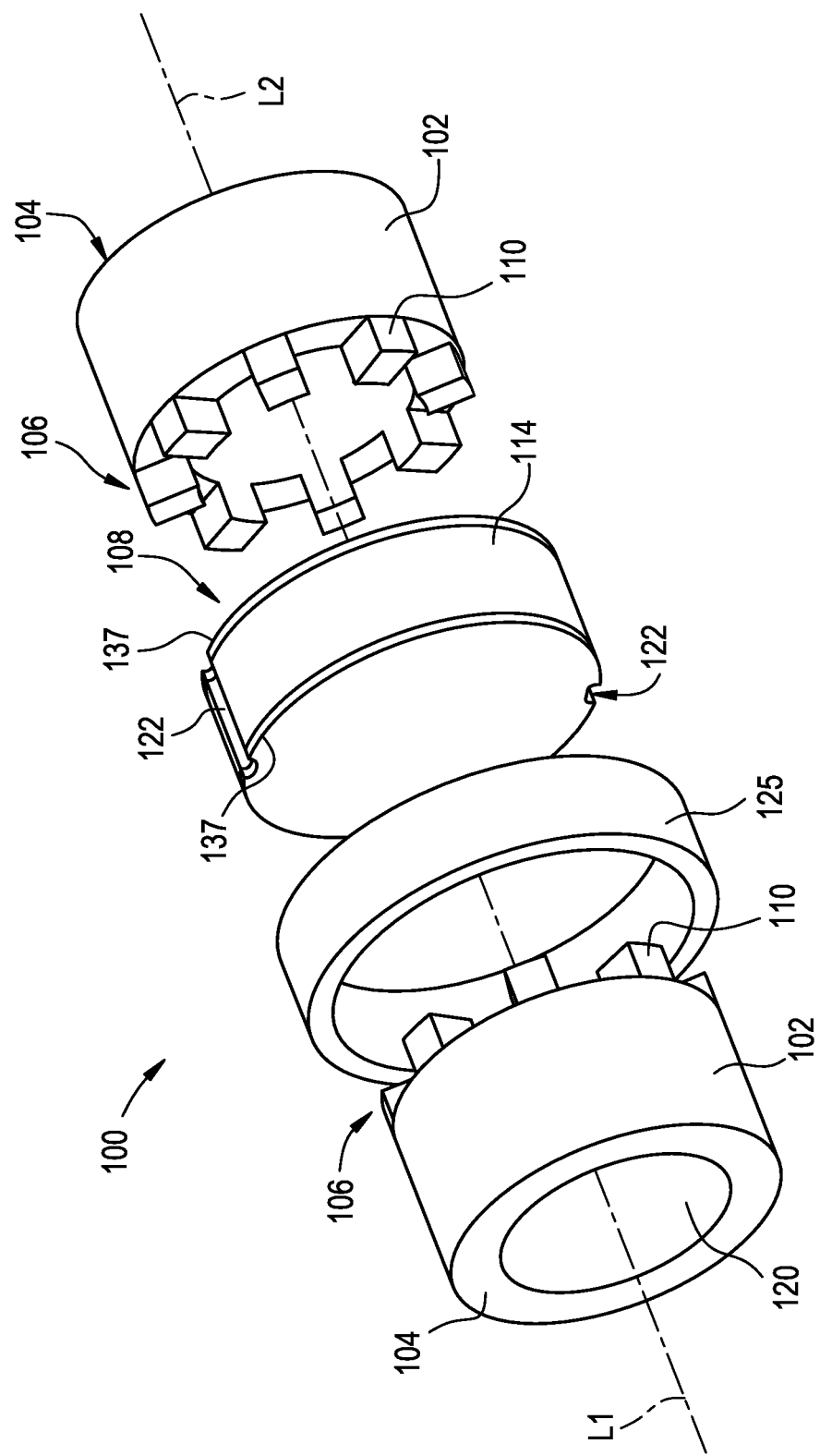
FIG. 7 is an exploded view of a flexible coupling in accordance with another embodiment of the disclosure.
Figure 8:
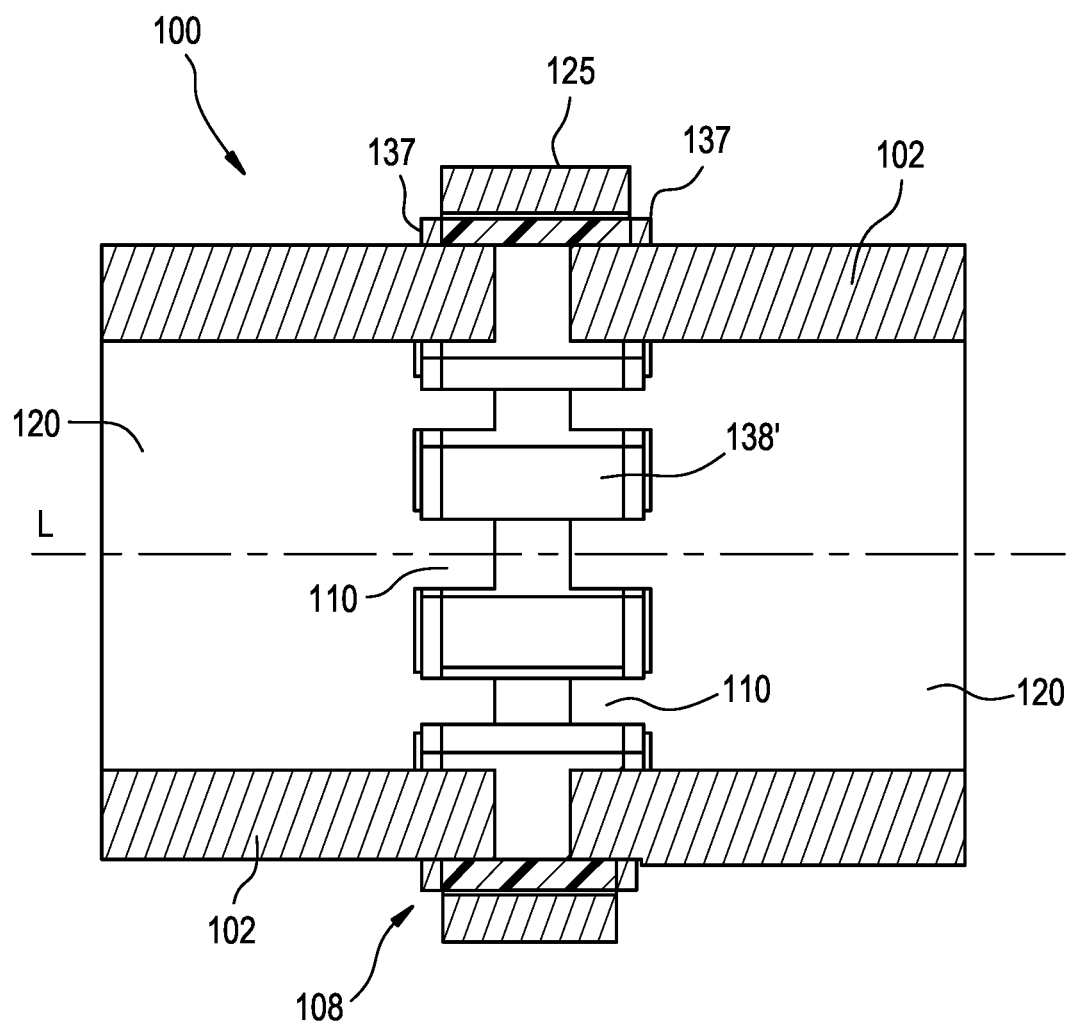
FIG. 8 is a cross sectional view of the flexible coupling in accordance with the embodiment of FIG. 7.
Figure 9:
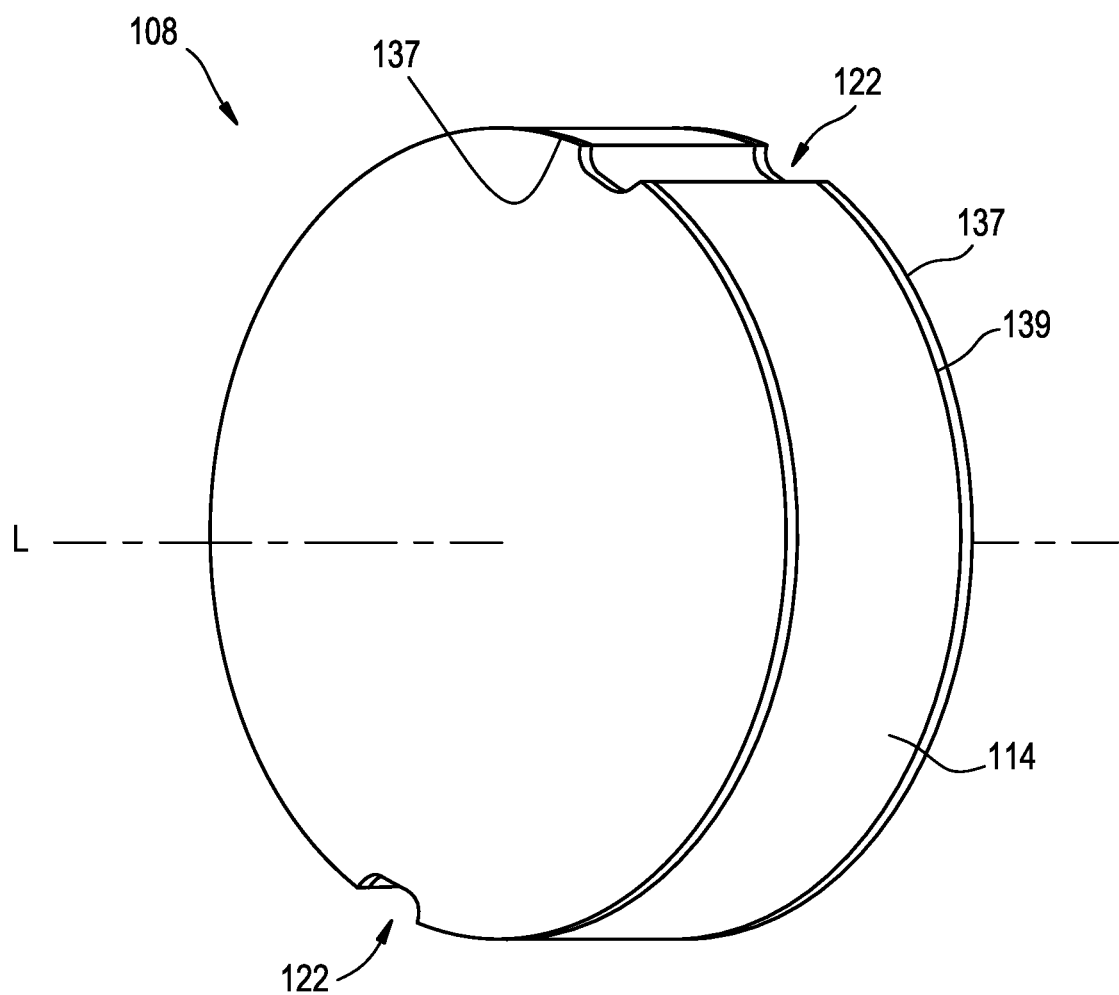
FIG. 9 is a perspective view of the flexible member assembly in accordance with the embodiment of FIG. 7.

As can be appreciated, a range of different spans of the cap 136 can be used anywhere between a single pair of dowels to a full set of dowels extending around the entire end face, as shown in FIG. 4B. The different spans can be used to cover the entire face of a solid flexible coupling, and also alternative types of couplings that are commonly used including a split coupling having a slit on one side, or a fully split coupling having slits on both sides such that the coupling is formed by two semi-cylindrical pieces assembled together to form a full cylindrical coupling. The cap as shown in FIG. 4B would thus occupy half the bores 134 and would be mounted adjacent a mating pair cap to occupy and cover the remaining bores. Other span angles may also be used. It is also noted that the inner periphery 132 of the embodiments for the caps 136 shown in FIG. 4B may alternatively be formed to be smooth, and the inner row of dowels 138 may be omitted such that the caps may be installed from the opposite direction shown in FIG. 4A to occupy the bores 134 in the row of teeth 112. In the embodiment of FIGS. 7-9, two opposed plates 137, appropriately sized, are connected at least to the row of dowels 138 such that both axial faces of the teeth 112 on each side of the flexible spline 114 are faced by the plates 137.

Figure 6:
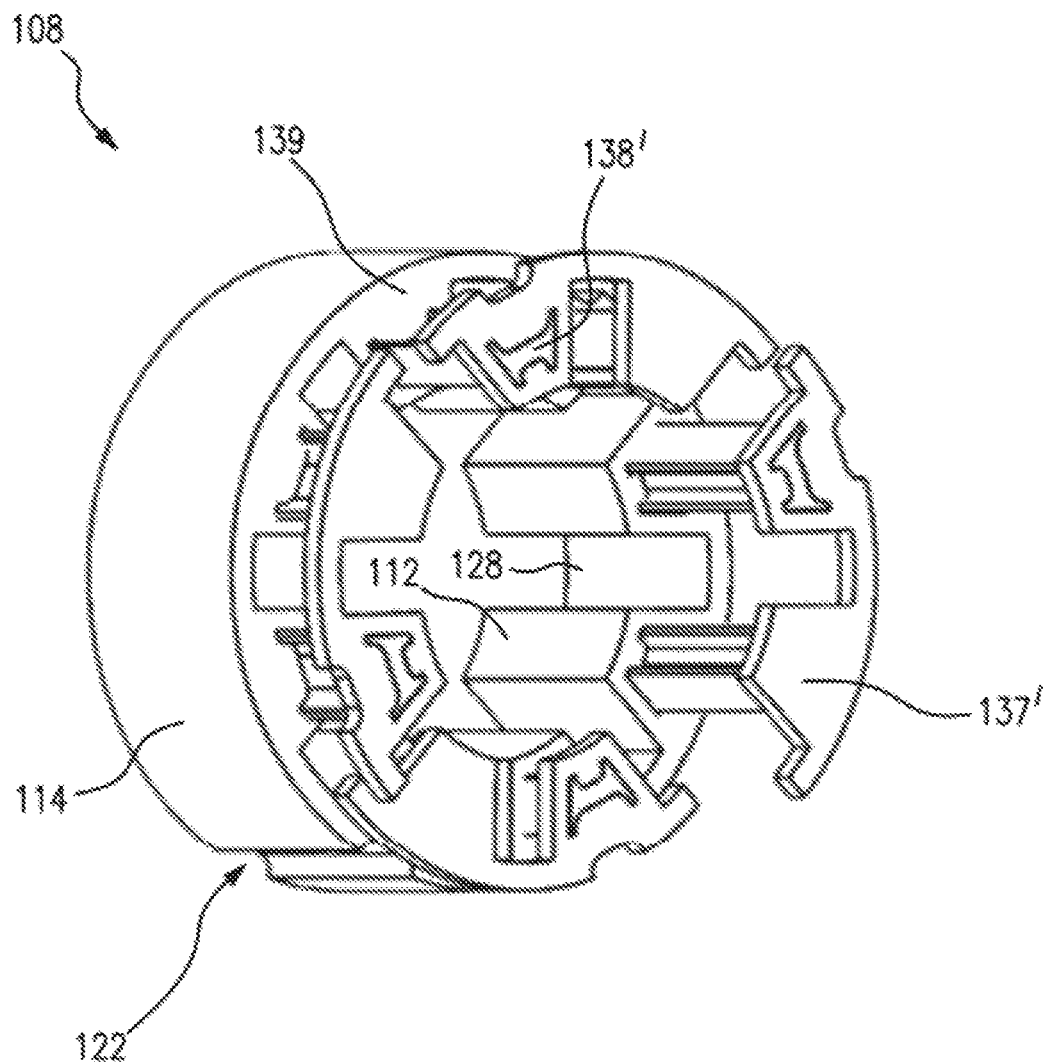
FIG. 6 is a perspective view of a segmented tooth support cap of a flexible spline in accordance with an alternative embodiment of the disclosure.

Referring now to FIG. 6, there is a perspective view of a segmented tooth support cap 137' of a flexible spline 114 in accordance with an alternative embodiment of the disclosure. In this embodiment, the tooth segmented support cap or plate 137' is configured to be congruent to the inner and outer circumference of flexible spline 114 and includes a plurality of plate segments 137' as shown in FIG. 6. In certain embodiments, the plurality of plate segments 137' may provide easier dowel 138' insertion into teeth 112 of flexible spline 114 when an application or use requires an enlarged sized flexible spline 114. For example, in an application where assembly of the flexible member assembly 108 would make insertion of the dowels 138 or 138' difficult or burdensome as a larger single unit, it is more efficient and cost effective to use a plurality of smaller plate segments 137' during assembly thereof.

Use of any of the dowels 126, 138 or 138' described herein to stiffen the teeth formed on the axial ends of a flexible spline 114, which meshably engage with hubs 102 disposed on shafts (not shown), has proven to considerably increase the torque capacity of the flexible coupling 100 (reinforced element) as compared to a baseline coupling, i.e., a coupling with no dowels disposed on the ends of the flexible coupling 100. To quantify this torque capability increase in exemplary implementations, certain experiments were performed. The purpose of the experiments was to quantify the torsional stiffness and the increased performance of different varieties of stiffening caps in accordance with the disclosure as compared to a baseline coupling. A D-flex® coupling was used as a baseline and also modified for the testing. One of the metrics examined were increases in terms of torque required to shear the teeth of the flexible spline being tested. The scope of the test conducted on the baseline and improved couplings was to statically test the improved coupling designs to identify torsional stiffness, quantify tooth shear strength, and baseline them against the baseline design, which did not include any stiffening structures in the teeth.

In order to validate the benefit of adding a reinforcing elements or dowels 126, 138, 138' to a flexible sleeve member or spline coupling 114, a reinforced wrap element was dynamically tested alongside the same size homogenous material coupling. The reinforced coupling exhibited a 40% increase in useable life when compared to the homogenous material coupling.

Based on testing outlined above, reinforcing the element from bending improves the useable life of the wrap coupling design.

Further, testing illustrates that tooth reinforcements have the potential to increase the torque capacity of sleeve coupling elements without impacting the torsional stiffness or the formulation of the base rubber compound, as the base rubber was the same between samples. Additionally, these tooth reinforcements could be any material that has a substantially higher durometer/stiffness than the base rubber material. Urethane, plastics, rubber, or other metals could be used. Further consideration should be given in terms of the actual shape of the reinforcement in addition to circular shapes, which were the only shapes tested. A geometric shape that mimics the profile of the tooth, such as the embodiment shown in FIG. 5A, may further provide reinforcement in higher torque situations.

The elastomeric reinforced spline uses the increased modulus of elasticity of stronger materials and geometry of the reinforcement to increase the area moment of inertia to resist the shear stress and bending stress within the element. Both features decrease in bending stress increases the fatigue life of the material. The cross section of the reinforcement may be an "I beam", circle, ellipse, polygon, or the like, and the location of the reinforcement of the element is placed in the center element spline to provide maximum impact. The material may be metallic, nonmetallic, composite, or a combination of materials. By bonding the reinforcement within a softer elastomeric element, by vulcanized, cold bonding or interference fit, the element dampens shock loading by utilizing a lower modulus of elasticity. The softer material may be a thermoset or thermoplastic. The element shape utilizes the current split splined design, allowing for the element to install over current shaft hub without moving the hubs. Each reinforcement on the element may be separate or joined along the face of the coupling for ease of assembly.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A flexible coupling, comprising:
   a first hub having first teeth, the first hub being configured to engage a first shaft;
   a second hub having second teeth, the second hub being configured to engage a second shaft;
   a flexible spline disposed between the first hub and the second hub, and comprising third teeth and holes each formed in a respective tooth of the third teeth; and
   a cap comprising a plate disposed between the flexible spline and the second hub, and dowels each extending from the plate through a respective hole of the holes,
   wherein the third teeth mesh with the first teeth and the second teeth such that each of the first teeth are disposed between two adjacent holes of the holes and each of the second teeth are disposed between two adjacent holes of the holes.

2. The flexible coupling of claim 1, wherein the plate has a generally annular shape, and the dowels are arranged in a circular pattern.

3. The flexible coupling of claim 2, wherein the dowels are arranged symmetrically around the plate and on a same side of the plate.

4. The flexible coupling of claim 3, wherein a number of the dowels is equal to a number of the holes.

5. The flexible coupling of claim 4, wherein the holes are through-holes that each have a circular cross section.

6. The flexible coupling of claim 5, wherein each of the dowels has a circular cross section.

7. The flexible coupling of claim 2, wherein the dowels are made of a metal composite material.

8. The flexible coupling of claim 2, wherein the plate is adhered to a face of the flexible spline.

9. The flexible coupling of claim 1, wherein the plate comprises a plurality of plate segments each having a generally curved shape and being arranged to cover an entire face of the flexible spline.

10. The flexible coupling of claim 1, further comprising another plate disposed between the flexible spline and the first hub, wherein the other plate is connected to the dowels.

11. The flexible coupling of claim 1, wherein the first teeth extend axially, the second teeth extend axially, and the first teeth are angularly aligned with the second teeth.

12. The flexible coupling of claim 1, wherein the third teeth extend radially inward.

13. The flexible coupling of claim 1, wherein the third teeth extend radially inward from a substantially cylindrical exterior surface of the flexible spline.

14. The flexible coupling of claim 1, further comprising a wrap portion encircling and fastened to the flexible spline.

* * * * *